United States Patent
Odaira et al.

(10) Patent No.: US 10,609,230 B2
(45) Date of Patent: Mar. 31, 2020

(54) INFORMATION PROCESSING APPARATUS THAT SUPPRESSES ERRONEOUS OPERATION BY USER, CONTROL METHOD FOR THE INFORMATION PROCESSING APPARATUS, AND STORAGE MEDIUM

(71) Applicant: CANON KABUSHIKI KAISHA, Tokyo (JP)

(72) Inventors: Masahiro Odaira, Nagareyama (JP); Yuichi Yagi, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/453,107

(22) Filed: Mar. 8, 2017

(65) Prior Publication Data
US 2017/0272591 A1    Sep. 21, 2017

(30) Foreign Application Priority Data
Mar. 17, 2016    (JP) .................. 2016-053815

(51) Int. Cl.
*G06F 3/12*    (2006.01)
*H04N 1/00*    (2006.01)
(Continued)

(52) U.S. Cl.
CPC ......... *H04N 1/00477* (2013.01); *G06F 3/041* (2013.01); *G06F 3/04886* (2013.01); *H04N 1/00307* (2013.01); *H04N 1/00384* (2013.01); *H04N 1/00392* (2013.01); *H04N 1/00411* (2013.01); *H04N 1/00474* (2013.01);
(Continued)

(58) Field of Classification Search
None
See application file for complete search history.

(56) References Cited

U.S. PATENT DOCUMENTS 9,036,192 B2    5/2015    Watanabe et al.
2009/0066998 A1*    3/2009    Kato ............... G01C 21/26
                                                                358/1.15
(Continued)

FOREIGN PATENT DOCUMENTS

| JP | 2008009611 A | 1/2008 |
|---|---|---|
| JP | 2014107859 A | 6/2014 |
| JP | 2014171156 A | 9/2014 |

OTHER PUBLICATIONS

Office Action issued in Japanese Appln. No. 2016-053815 dated Nov. 12, 2019.

*Primary Examiner* — Henok Shiferaw
(74) *Attorney, Agent, or Firm* — Rossi, Kimms & McDowell LLP

(57) ABSTRACT

An information processing apparatus capable of suppressing an erroneous operation by a user when a mobile terminal is brought close to the information processing apparatus for near field wireless communication. Approach of a mobile terminal is detected. Whether an operation related to performing specific processing has been carried out by a user is determined. A confirmation screen for confirming with the user whether to perform processing corresponding to the operation related to performing the specific processing is displayed when the approach of the mobile terminal is detected and it is determined that the operation related to performing the specific processing has been carried out.

22 Claims, 8 Drawing Sheets

(51) Int. Cl.
*G06F 3/041* (2006.01)
*G06F 3/0488* (2013.01)
*H04N 1/327* (2006.01)

(52) U.S. Cl.
CPC ....... *H04N 1/32767* (2013.01); *G06F 3/0414* (2013.01); *H04N 2201/006* (2013.01); *H04N 2201/0036* (2013.01); *H04N 2201/0039* (2013.01); *H04N 2201/0094* (2013.01)

(56) References Cited

U.S. PATENT DOCUMENTS

| | | | | |
|---|---|---|---|---|
| 2009/0207445 | A1* | 8/2009 | Kimura | H04N 1/00307 |
| | | | | 358/1.15 |
| 2016/0211888 | A1* | 7/2016 | Funakawa | H04B 5/0093 |
| 2016/0373594 | A1* | 12/2016 | Kurihara | H04N 1/00103 |
| 2017/0104890 | A1* | 4/2017 | Miyazaki | A61B 5/01 |
| 2017/0269886 | A1* | 9/2017 | Ozawa | G06F 3/1203 |
| 2018/0069970 | A1* | 3/2018 | Tsujimoto | H04N 1/00233 |

* cited by examiner

INFORMATION PROCESSING APPARATUS THAT SUPPRESSES ERRONEOUS OPERATION BY USER, CONTROL METHOD FOR THE INFORMATION PROCESSING APPARATUS, AND STORAGE MEDIUM

BACKGROUND OF THE INVENTION

Field of the Invention

The present invention relates to an information processing apparatus, a control method for the information processing apparatus, and a storage medium, and particularly relates to an information processing apparatus that suppresses an erroneous operation by a user when a mobile terminal is brought close to the information processing apparatus for near field wireless communication, a control method for the information processing apparatus, and a storage medium.

Description of the Related Art

In recent years, terminals with functions such as pairing or authentication based on near field wireless communication technology called near field communication (NFC) have been heavily used. The pairing is a communication method in which information of terminals is transmitted and received between the terminals using the NFC technology. The pairing is also used as a trigger in a case of performing high-speed wireless communication of, for example, the Bluetooth (registered trademark) standard or Wi-Fi Direct (registered trademark) standard which allows safe and fast communication of large amounts of data between terminals. The pairing enables information necessary for the high-speed wireless communication to be shared between terminals by, for example, a user just holding one terminal over another terminal and thereby complicated settings for the high-speed wireless communication can automatically be finished (for example, Japanese Laid-Open Patent Publication (kokai) No. 2014-107859).

Additionally, in recent years, cases where an image forming apparatus such as a multi-function device or a printer uses the NFC technology have increased. The image forming apparatus using the NFC technology preliminarily writes its device information (such as an SSID, an encryption method, and an IP address) to an NFC tag that stores information relating to the NFC. Moreover, the image forming apparatus is connected to a network while being capable of performing the high-speed wireless communication of, for example, the Bluetooth or Wi-Fi Direct standard. Here, holding the mobile terminal that uses the NFC technology over the NFC tag of the image forming apparatus enables the communication between the image forming apparatus and the mobile terminal to switch from the NFC communication to the high-speed wireless communication on the basis of the information read via the NFC tag. Accordingly, the user can transmit and receive a print job or a scan job between the mobile terminal and the image forming apparatus with the high-speed wireless communication by just holding the mobile terminal over the image forming apparatus.

However, since the NFC tag is generally arranged at a user interface (UI) unit which receives operation by a user in the image forming apparatus, there is a possibility of the user operating the UI unit erroneously when bringing the mobile terminal close to the NFC tag. For example, if a start button for starting an image forming process is arranged next to the NFC tag, there is a possibility of the user pressing the start button erroneously with the hand holding the mobile terminal. Also, if a touch panel that receives a touch input is arranged next to the NFC tag, there is a possibility of the user touching the touch panel erroneously with the hand holding the mobile terminal. Moreover, there is a possibility of pressing the start button or touching the touch panel erroneously with the mobile terminal.

SUMMARY OF THE INVENTION

The present invention provides an information processing apparatus capable of suppressing an erroneous operation by a user when a mobile terminal is brought close to the information processing apparatus for near field wireless communication, a control method for the information processing apparatus, and a storage medium.

Accordingly, the present invention provides an information processing apparatus comprising a detection unit configured to detect approach of a mobile terminal, a determination unit configured to determine whether an operation related to performing specific processing has been carried out by a user, and a display control unit configured to display a confirmation screen for confirming with the user whether to perform processing corresponding to the operation related to performing the specific processing when the detection unit detects the approach of the mobile terminal and the determination unit determines that the operation related to performing the specific processing has been carried out.

According to the present invention, the erroneous operation by the user when the mobile terminal is brought close to the information processing apparatus for near field wireless communication can be suppressed.

Further features of the present invention will become apparent from the following description of exemplary embodiments (with reference to the attached drawings).

DESCRIPTION OF THE EMBODIMENTS

Figure 1:
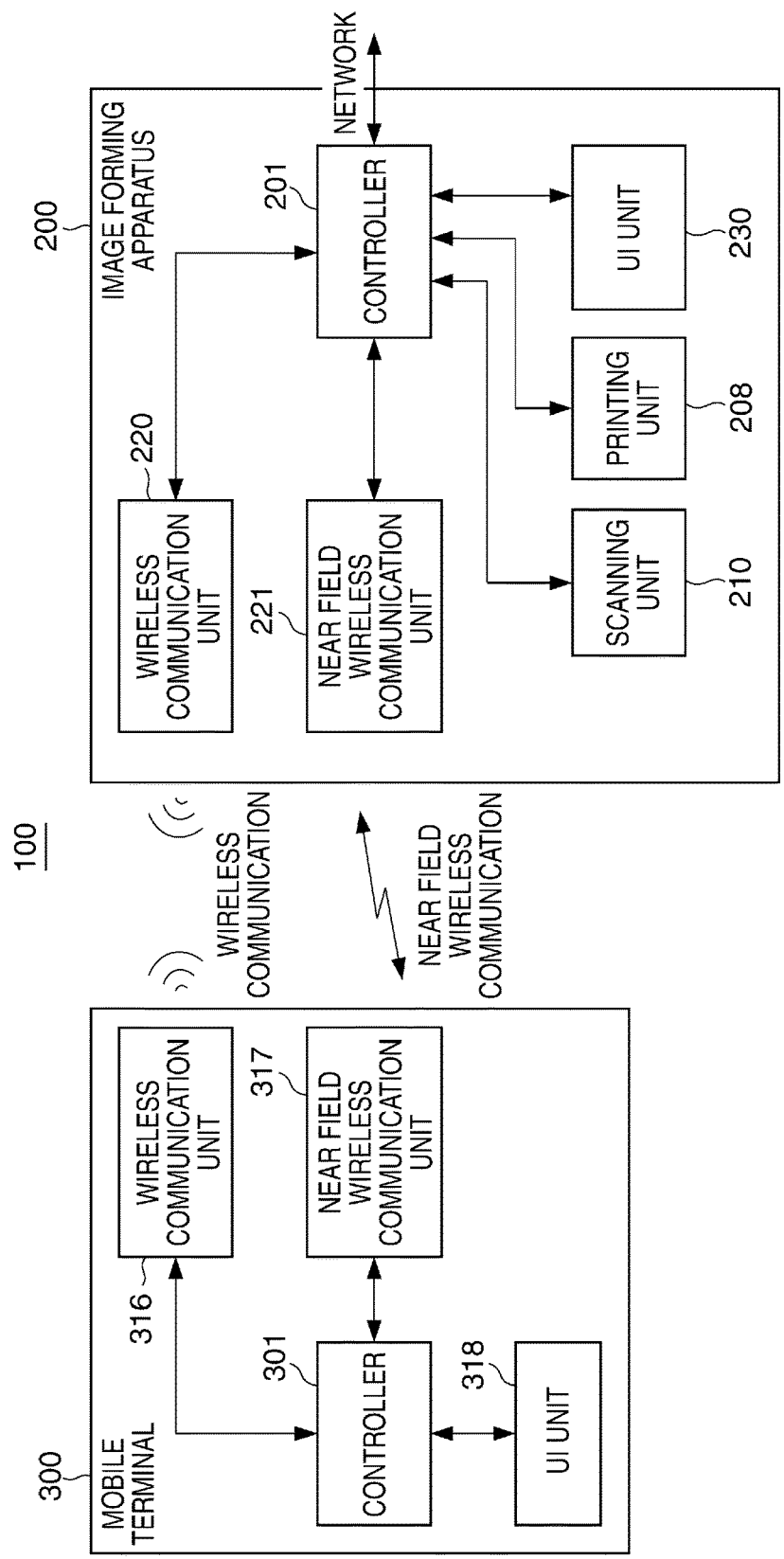
FIG. 1 is a diagram schematically showing a configuration of an image forming system including an image forming apparatus as an information processing apparatus according to the present invention.

FIG. 1 is a diagram schematically showing a configuration of an image forming system 100 including an image forming apparatus 200 as an information processing apparatus according to a first embodiment of the present invention.

In the image forming system 100, the image forming apparatus 200 is a multi functional peripheral (MFP) including a plurality of functions such as printing, scanning, copying, faxing, and scanning and sending. The image forming apparatus 200 includes a controller 201, a printing unit 208, a scanning unit 210, a UI unit 230, a wireless communication unit 220, and a near field wireless communication unit 221. The wireless communication unit 220 performs wireless communication with an external device via a wireless LAN (for example, Wi-Fi). The near field wireless communication unit 221 performs wireless communication based on an NFC standard usually within a range of a few cm to ten-odd cm. Details of a configuration of hardware of the image forming apparatus 200 will be described below with reference to FIG. 2.

A mobile terminal 300 is, for example, a portable phone such as a smart phone, a tablet personal computer, a laptop computer, or a PDA, and includes a controller 301, a wireless communication unit 316, a near field wireless communication unit 317 and, a UI unit 318. The wireless communication unit 316 performs wireless communication via a wireless LAN. The near field wireless communication unit 317 performs wireless communication based on the NFC standard similarly to the near field wireless communication unit 221. Details of a configuration of hardware of the mobile terminal 300 will be described below with reference to FIG. 3. The present embodiment will describe an example of performing near field wireless communication and wireless communication between the image forming apparatus 200 and the mobile terminal 300.

Figure 2:
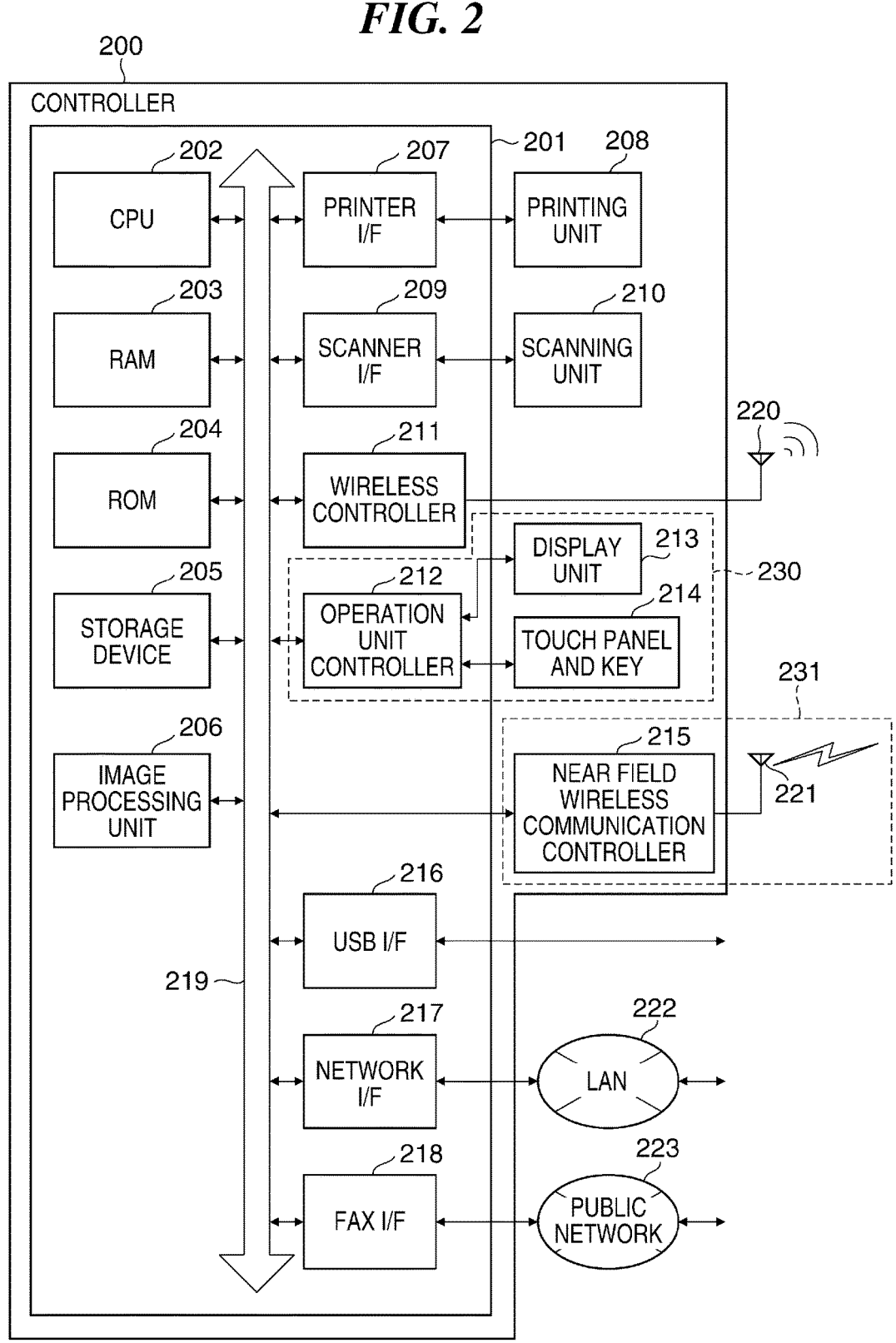
FIG. 2 is a block diagram schematically showing a configuration of hardware of the image forming apparatus in FIG. 1.

FIG. 2 is a diagram schematically showing a configuration of hardware of the image forming apparatus 200 in FIG. 1.

In FIG. 2, the controller 201 includes a CPU 202, a RAM 203, a ROM 204, a storage device 205, an image processing unit 206, a printer I/F 207, and a scanner I/F 209. The controller 201 further includes a wireless controller 211, an operation unit controller 212, a USB I/F 216, a network I/F 217, and a FAX I/F 218. Moreover, the controller 201 is electrically connected to the printing unit 208, the scanning unit 210, a display unit 213, a touch panel and key 214, and a near field wireless communication controller 215, and controls each of these components.

The CPU 202 controls the whole image forming apparatus 200, and is connected to each of the components via a system bus 219. The RAM 203 is a system work memory for the CPU 202 to operate, and stores arithmetic data and various kinds of programs of the CPU 202. The RAM 203 also functions as an image memory that holds image data to which various kinds of image processing have been performed in the image processing unit 206 when processing relating to a printing function is performed. The ROM 204 is a boot ROM and stores a boot program of the image forming apparatus 200. The storage device 205 is a non-volatile secondary storage device for storing a large-sized program and data. The program and data stored in the storage device 205 are used by being applied to the RAM 203.

The printer I/F 207 is connected to the printing unit 208 and prints image data read from a document to a sheet. The scanner I/F 209 is connected to the scanning unit 210 and reads a document. The wireless controller 211 is connected to an access point not shown or the mobile terminal 300 via the wireless communication unit 220 and performs wireless LAN communication. The operation unit controller 212 is connected to the display unit 213 and the touch panel and key 214, and receives various kinds of settings from a user as well as displays, for example, an alarm. The operation unit controller 212, the display unit 213, and the touch panel and key 214 configure the UI unit 230. The image forming apparatus 200 notifies the user of status as well as receives various kinds of operations from the user by using the UI unit 230.

The USB I/F 216 is connected to a personal computer not shown via a USB connector not shown, and performs USB communication. The network I/F 217 is connected to a LAN 222 via a LAN I/F connector not shown, and for example, performs network communication with a personal computer not shown or another device. The FAX I/F 218 is connected to a public network 223 via a modular jack not shown, and transmits and receives a fax with an external device.

The near field wireless communication controller 215 is connected to the near field wireless communication unit 317 of the mobile terminal 300 via the near field wireless communication unit 221, and performs the near field wireless communication. The near field wireless communication in the present embodiment is, for example, NFC. Also, the near field wireless communication controller 215 includes a memory element such as an EEPROM and functions as an NFC tag that stores device information of the image forming apparatus 200 in the memory element. The near field wireless communication controller 215 and the near field wireless communication unit 221 configure a near field wireless communication unit 231.

Figure 3:
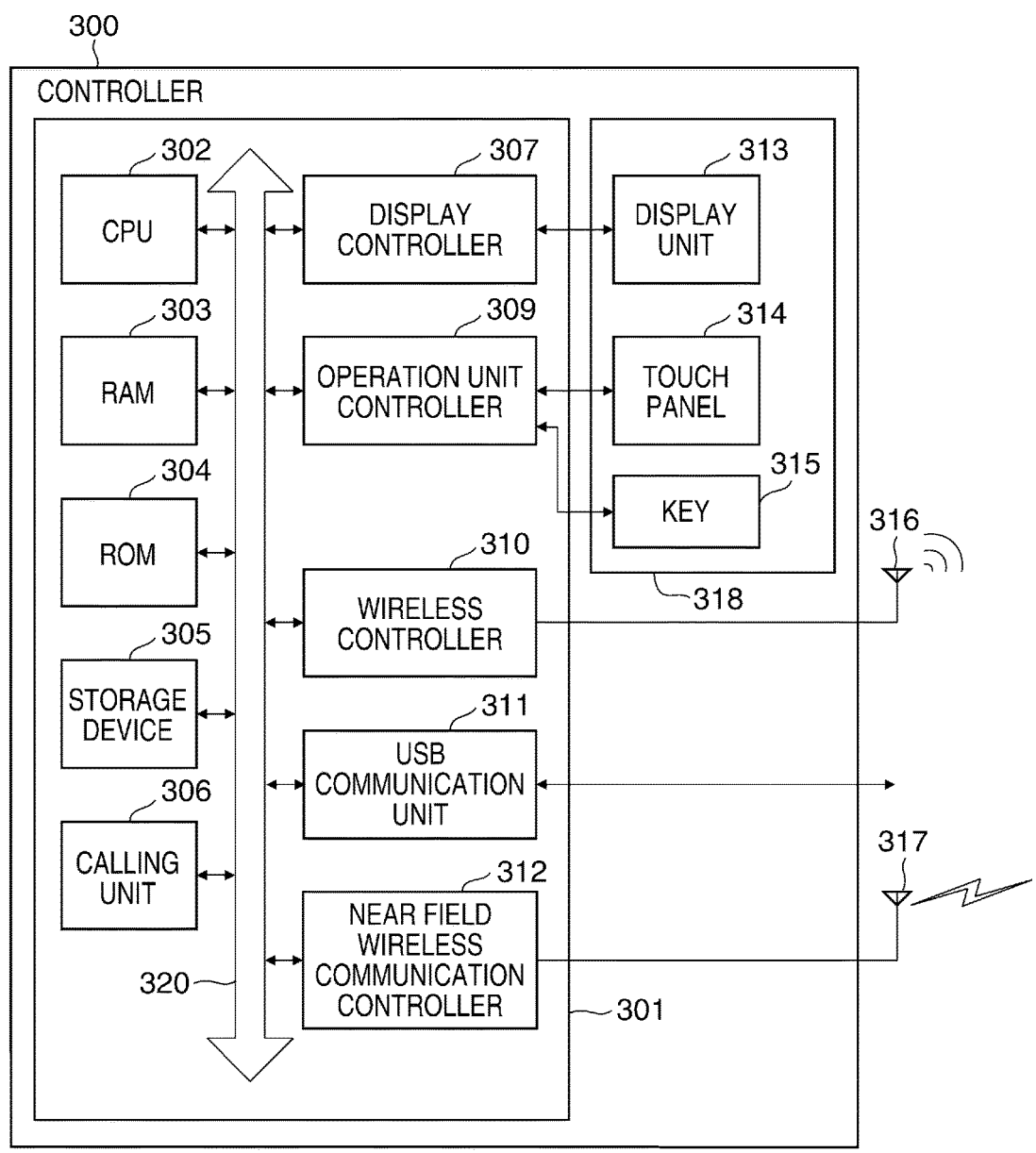
FIG. 3 is a block diagram schematically showing a configuration of hardware of a mobile terminal in FIG. 1.

FIG. 3 is a diagram schematically showing a configuration of hardware of the mobile terminal 300 in FIG. 1.

In FIG. 3, the controller 301 includes a CPU 302, a RAM 303, a ROM 304, a storage device 305, and a calling unit 306. The controller 301 further includes a display controller 307, an operation unit controller 309, a wireless controller 310, a USB communication unit 311, and a near field wireless communication controller 312. Also, the controller 301 is electrically connected to a display unit 313, a touch panel 314, and a key 315, and controls each of these components.

The CPU 302 controls the whole mobile terminal 300, and is connected to each of the components via a system bus 320. The RAM 303 is a system work memory for the CPU 302 to operate, and stores arithmetic data and various kinds of programs of the CPU 302. The ROM 304 is a boot ROM and stores a boot program of the mobile terminal 300. The storage device 305 is a non-volatile secondary storage device for storing a large-sized program and data. The program and data stored in the storage device 305 are used by being applied to the RAM 303. The calling unit 306 provides a voice calling function when the mobile terminal 300 functions as a portable phone.

The UI unit 318 includes the display unit 313, the touch panel 314, and the key 315. The display unit 313 is, for example, an LCD or an organic EL display. The touch panel 314 is a capacitance or resistance film (pressure-sensitive) touch panel. The display unit 313 is connected to the display controller 307. The touch panel 314 and the key 315 are connected to the operation unit controller 309.

The wireless controller 310, the USB communication unit 311, and the near field wireless communication controller 312 function as an external I/F. The wireless controller 310 performs wireless LAN communication with an access point not shown or the image forming apparatus 200 via the wireless communication unit 316. The USB communication unit 311 is connected to a personal computer via a USB not shown and performs USB communication. The near field wireless communication controller 312 performs near field wireless communication with the image forming apparatus 200 or another device having a near field wireless communication function, via the near field wireless communication unit 317.

The mobile terminal 300 reads device information, by the near field wireless communication, stored in the memory element of the near field wireless communication controller 215 of the image forming apparatus 200, and performs wireless LAN connection between the image forming apparatus 200 and the mobile terminal 300 on the basis of the device information. Also, the mobile terminal 300 writes user information stored, for example, in a memory of the mobile terminal 300, to the memory element of the near field wireless communication controller 215 by the near field wireless communication. On the basis of the written user information, the image forming apparatus 200 performs user authentication. It should be noted that in the present embodiment, the near field wireless communication controller 215 as an NFC tag does not output electric waves because the near field wireless communication (NFC communication) is started by the image forming apparatus 200 receiving electric waves (magnetic field) from the mobile terminal 300.

Figure 4A:
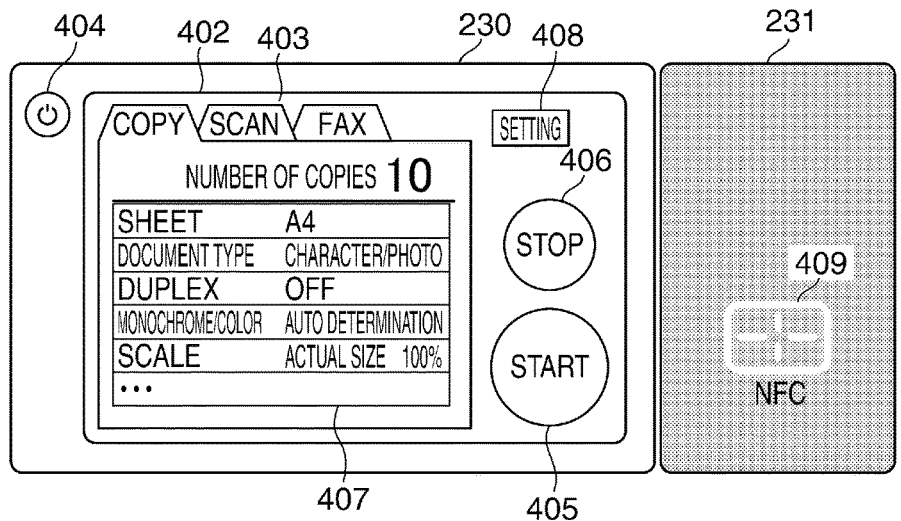
FIGS. 4A to 4C are views showing a UI unit and a near field wireless communication unit of the image forming apparatus in FIG. 1.
Figure 4B:
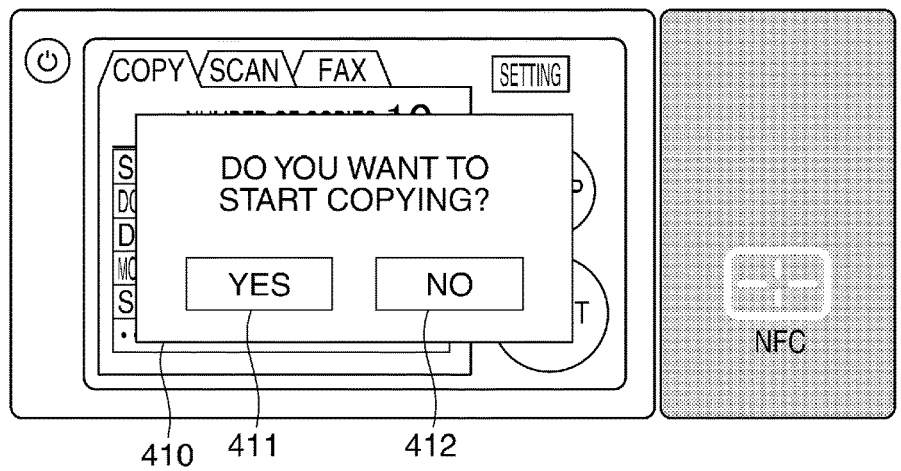
Figure 4C:
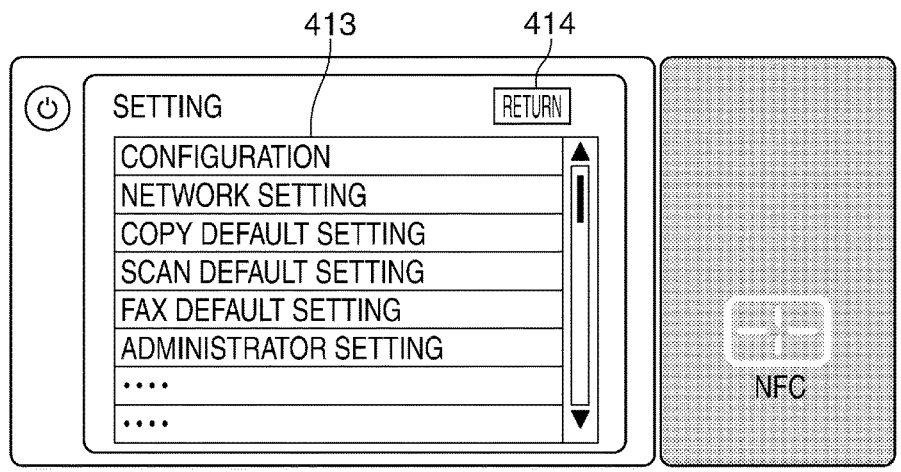

FIGS. 4A to 4C are views showing the UI unit 230 and the near field wireless communication unit 231 of the image forming apparatus 200 in FIG. 1. FIG. 4A shows a case where a copy function is selected. FIG. 4B shows a case where a confirmation screen is displayed. FIG. 4C shows a case where a setting screen is displayed.

The UI unit 230 includes a display 402, a touch panel 403, and a power key 404. The power key 404 is a switch which has a mechanical contact unlike the touch panel 403, and receives an operation from the user. In FIG. 4A, a start button 405, a stop button 406, a setting screen 407, and a setting button 408 are displayed on the display 402. When the user presses, for example, the start button 405 by a finger etc., the touch operation is detected at the touch panel 403, and then a type of operation by the user (in this case, the start button 405 has been pressed) is determined on the basis of the coordinates of the pressed position. Here, because a "COPY" function tab is selected on the setting screen 407, when the start button 405 is pressed, the image forming apparatus 200 determines that a copy processing performing instruction has been received and performs the copy processing. On the other hand, when the stop button 406 is pressed, the image forming apparatus 200 receives a pause or a cancel of the copy processing in process. Also, the setting screen 407 receives various kinds of settings for the copy processing. When the setting button 408 is pressed, the image forming apparatus 200 changes the screen to the setting screen shown in FIG. 4C. It should be noted that in FIG. 4A, although "COPY", "SCAN", and "FAX" are displayed as function tabs that can be selected, in the UI unit 230, a function tab of another function included in the image forming apparatus 200 can also be displayed.

The near field wireless communication unit 231 includes a near field wireless communication point 409. The near field wireless communication point 409 is a place where the near field wireless communication unit 317 of the mobile terminal 300 approaches in a case of the near field wireless communication. The user makes the mobile terminal 300 approach the image forming apparatus 200 using the near field wireless communication point 409 as a guide when performing the near field wireless communication between the mobile terminal 300 and the image forming apparatus 200.

FIG. 4B shows a confirmation screen 410 which is displayed when the start button 405 is pressed while electric waves by the near field wireless communication are being detected. The confirmation screen 410 in FIG. 4B is displayed so as to confirm with the user whether to perform the processing corresponding to the pressed button (here, the copy processing). Here, if the user presses an operation continue button 411, the copy processing performing instruction is received and the copy processing is performed. On the other hand, if the user presses an operation cancel button 412, the copy processing performing instruction is canceled and the confirmation screen 410 is closed. It should be noted that when the electric waves by near field wireless communication are not detected, the confirmation screen 410 is not displayed even if the user presses the start button 405.

FIG. 4C shows a setting screen displayed when the user presses the setting button 408. In the setting screen, setting items 413 are used for various settings to be set for the image forming apparatus 200. When a return button 414 is pressed, the image forming apparatus 200 changes the screen to the screen before the setting button 408 had been pressed.

Next, operation determination processing in the image forming apparatus 200 according to the present embodiment will be described.

Figure 5:
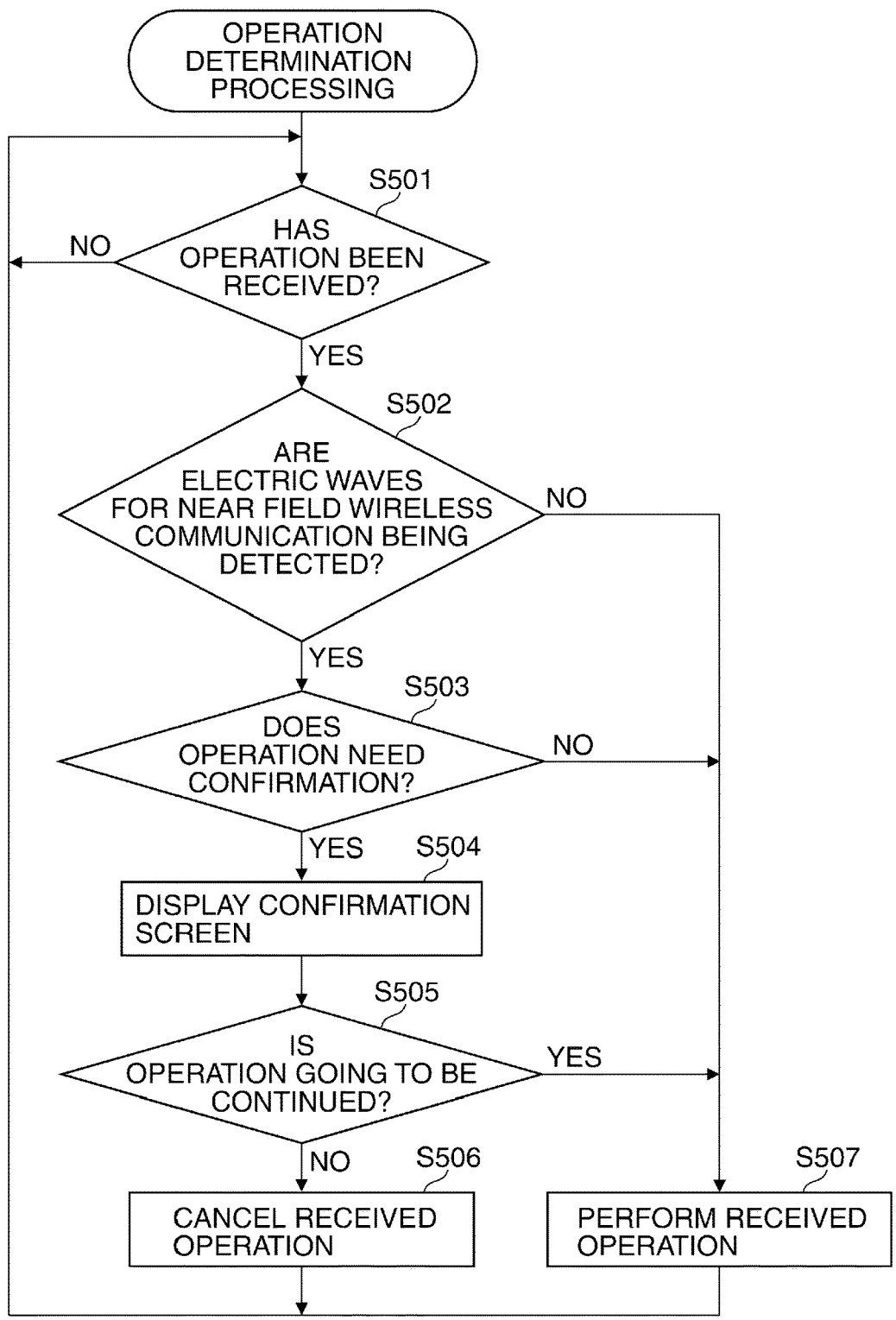
FIG. 5 is a flowchart showing operation determination processing in the image forming apparatus according a first embodiment of the present invention.

FIG. 5 is a flowchart showing the operation determination processing in the image forming apparatus 200 according to the present embodiment. The operation determination processing is performed by the CPU 202 applying the program stored in the ROM 204 or the storage device to the RAM 203. Here, operation determination processing performed when the copy screen in FIG. 4A is displayed, as a screen receiving an operation from the user, will be described.

In FIG. 5, the CPU 202 first determines whether an operation has been received from the user at the UI unit 230 (step S501). When it is determined in the step S501 that the operation from the user has been received, the CPU 202 determines whether the near field wireless communication controller 215 is detecting the electric waves in the NFC communication (step S502) (detection unit). When it is determined in the step S502 that the electric waves are being detected, the CPU 202 advances the processing to step S503, and when it is determined that the electric waves are not being detected, the CPU 202 advances the processing to step S507. In the present embodiment, detection of electric waves in the NFC communication corresponds to detection of the approach of the mobile terminal 300 to the image forming apparatus 200, and no detection of the electric waves corresponds to no detection of the approach of the mobile terminal 300.

In the step S503, the CPU 202 determines whether the user operation determined as received in the step S501 is an operation of processing which needs confirmation of performing from the user (operation related to performing specific processing, hereinafter called "specific operation") (determination unit). In the step S503, when the user operation determined as received in the step S501 is determined as the specific operation, the CPU 202 advances the processing to step S504. On the other hand, in the step S503, when the user operation determined as received in the step S501 is determined as not the specific operation, the CPU 202 advances the processing to the step S507. It should be noted that an operation which is not the specific operation is an operation of processing which does not need confirmation of performing from the user. In the present embodiment, the specific operation is pressing of the start button 405 of the copy function, and the operation which is not the specific operation is pressing of the setting button 408.

In the step S504, the CPU 202 displays the confirmation screen 410 shown in FIG. 4B on the UI unit 230 (display control unit), and determines whether the user has input, to the confirmation screen 410, an instruction to continue the operation. In step S505, when it is determined that the user has input an instruction not to continue the operation (pressed the no button 412), the CPU 202 advances the processing to step S506. In step S506, the CPU 202 stops the processing corresponding to the user operation determined as received in the step S501, and returns the processing to the step S501. On the other hand, in the step S505, when it is determined that the user has input an instruction to continue the operation (pressed the yes button 411), the CPU 202 advances the processing to the step S507. In the step S507, the CPU 202 performs the processing corresponding to the user operation determined as received in the step S501, and then returns the processing to the step S501. Here, when the user operation determined as received is pressing of the start button 405, the CPU 202 performs the copy processing. When the user operation determined as received is pressing of the setting button 408, the CPU 202 changes the display of the display 402 to the setting screen shown in FIG. 4C.

It should be noted that, although in the processing in FIG. 5, the specific operation is pressing of the start button 405 of the copy function, the specific operation is not limited to this. For example, the specific operation may be pressing of the stop button 406 of the copy function, or pressing of a start or stop button of any of a scan function, a FAX function, or a sending function of a scanned image not shown. Also, the specific operation may be an operation corresponding to another processing which the image forming apparatus 200 performs, for example, pressing of a confirmation button after changing the setting. Moreover, although in the processing in FIG. 5, an example of using the button (software key) displayed on the display 402 as a key for the user to input an instruction has been described, the key may be a hardware key.

According to the operation determination processing in FIG. 5, the confirmation screen 410 is displayed in a case of detecting the electric waves in the NFC communication when making the mobile terminal 300 approach the image forming apparatus 200 and determining that a user operation determined as received is the specific operation. As a result, an intention of the user who has checked the displayed confirmation screen 410 is reflected on processing after the display of the confirmation screen 410. Therefore, after the display of the confirmation screen 410, no processing unintended by the user is performed. As a result, an erroneous operation when the mobile terminal 300 approaches the image forming apparatus 200 can be suppressed.

Also, the image forming apparatus 200 detects the approach of the mobile terminal 300 on the basis of the electric waves output from the mobile terminal 300 for performing the NFC communication. The strength of the electric waves is proportional to a distance. Therefore, the approach of the mobile terminal 300 can be surely detected by making determination on the basis of the strength of the electric waves.

Moreover, in the operation determination processing in FIG. 5, even when the approach of the mobile terminal 300 is detected, if the user operation that has been determined as received is not the specific operation, the confirmation screen 410 is not displayed. Regarding the operations other than the specific operation, the image forming apparatus 200 does not perform any processing. Therefore, there is no need to confirm with the user about their intention of performing. As described above, by limiting opportunities to display the confirmation screen 410, the user can be free from inconvenience of always checking the confirmation screen 410.

Moreover, in the operation determination processing in FIG. 5, the specific operation may be determined as being carried out when a touch operation is carried out to a specific area on the touch panel 403. Here, the specific area is an area where an operation key for performing processing corresponding to the specific operation mentioned above is displayed or an area near there. For example, the specific area is an area near the start button 405 or the stop button 406. When a touch operation to the area near the start button 405 or the stop button 406 is carried out, the user has likely carried out the touch operation with an intention to press the start button 405 or the stop button 406. Therefore, when touch operations are carried out to these areas, the specific operation is determined as being carried out, whereby the convenience of the user can be improved.

Next, a second embodiment of the present invention will be described. In the present embodiment, the configurations and effects are basically the same as those in the first embodiment mentioned above. Therefore, descriptions of overlapped configurations and effects are omitted and a different configuration and effect will be described below.

Figure 6:
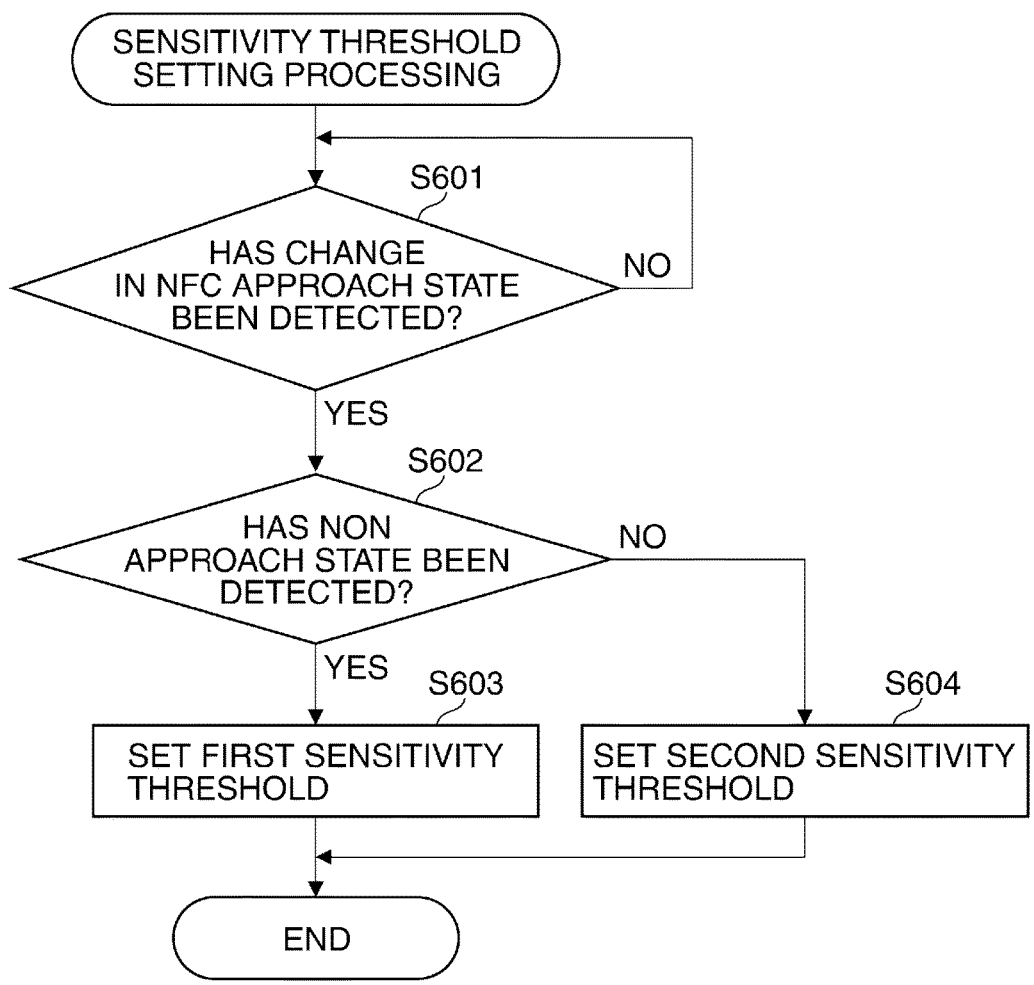
FIG. 6 is a flowchart showing sensitivity threshold setting processing in a second embodiment of the present invention.

FIG. 6 is a flowchart showing sensitivity threshold setting processing in the second embodiment of the present invention. The sensitivity threshold setting processing is performed by a CPU 202 reading the program stored in a ROM 204 and applying the program to a RAM 203.

In FIG. 6, the CPU 202 determines whether a change in the approach state of a mobile terminal 300 in NFC communication, i.e., transition from a non-approach state to an approach state or from an approach state to a non-approach state of the mobile terminal 300 has been detected (step S601) (first detection unit). A change in the approach state is detected, for example, on the basis of whether a near field wireless communication controller 215 has detected the electric waves in the NFC communication output from the mobile terminal 300. In the step S601, when a change in the approach state of the mobile terminal 300 has been determined as being detected, the CPU 202 determines whether the detected change is the transition from the approach state to the non-approach state (step S602). In the step S602, when a change to the non-approach state has been determined as being detected, the CPU 202 sets a first sensitivity threshold (first value) (step S603) (setting unit) as a sensitivity threshold for detecting a touch operation by a user to a touch panel 403, and finishes the processing. On the other hand, in the step S602, when the change to the non-approach state of the mobile terminal 300 has been determined as not being detected (the change to the approach state has been determined as being detected), the CPU 202 sets a second sensitivity threshold (second value) (step S604) different from the first sensitivity threshold as a sensitivity threshold, and finishes the processing.

Figure 7A:
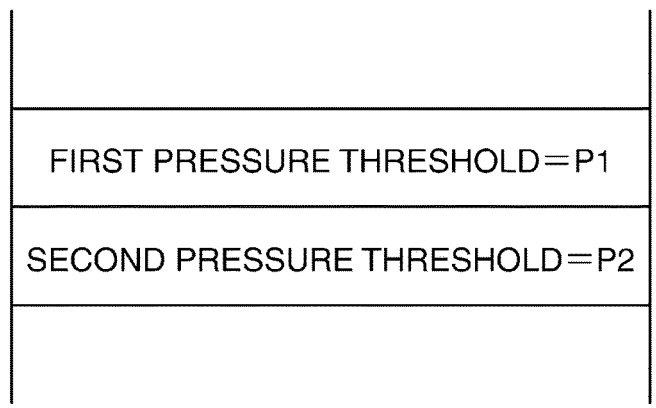
FIGS. 7A and 7B are diagrams showing examples of sensitivity thresholds.
Figure 7B:
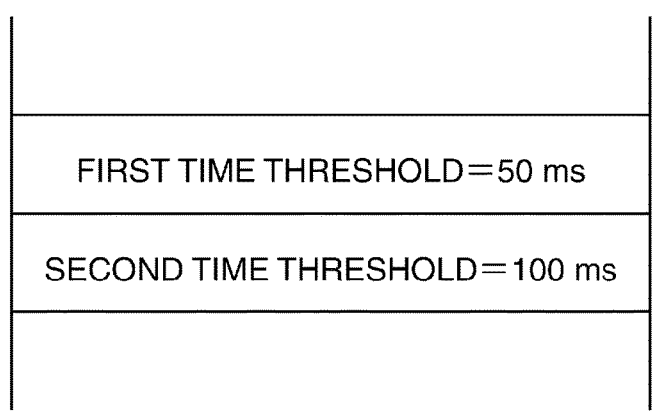

FIGS. 7A and 7B are diagrams showing exemplary configurations of the sensitivity threshold. FIG. 7A shows a case where pressure is adopted as the sensitivity threshold. FIG. 7B shows a case where time is adopted as the sensitivity threshold. The first sensitivity threshold and the second sensitivity threshold are preliminarily stored in the RAM 203 or the ROM 204 in both cases.

When pressure is adopted as the sensitivity threshold, a first pressure threshold P1 is set as the first sensitivity threshold, and a second pressure threshold P2 is set as the second sensitivity threshold. In the present embodiment, the second pressure threshold P2 is set larger than the first pressure threshold P1. Therefore, when the second pressure threshold is set as the sensitivity threshold, the user needs to press the touch panel 403 stronger than when the first sensitivity threshold is set. When time is adopted as the sensitivity threshold, a first time threshold is set as the first sensitivity threshold, and a second time threshold is set as the second sensitivity threshold. For example, when the first time threshold is 50 ms and the second time threshold is 100 ms and the second time threshold is set as the sensitivity threshold, the user needs to press the touch panel 403 longer than when the first time threshold is set. To be specific, when the second pressure threshold P2 or the second time threshold is set as the sensitivity threshold, a light touch operation by the user to the touch panel 403 is less likely to be detected. In other words, with the processing in FIG. 6, in a case of detecting the approach of the mobile terminal 300 in the NFC communication, a light touch operation to the touch panel 403 is less likely to be detected. Here, a light touch operation by the user when the mobile terminal 300 approaches the image forming apparatus 200 is likely an erroneous operation. However, according to this processing, the erroneous operation by the user can be suppressed. It should be noted that the time thresholds are not only the values mentioned above. The first time threshold may be set to somewhere between 45 ms and 55 ms. The second time threshold may be set to somewhere between 95 ms and 105 ms.

Figure 8:
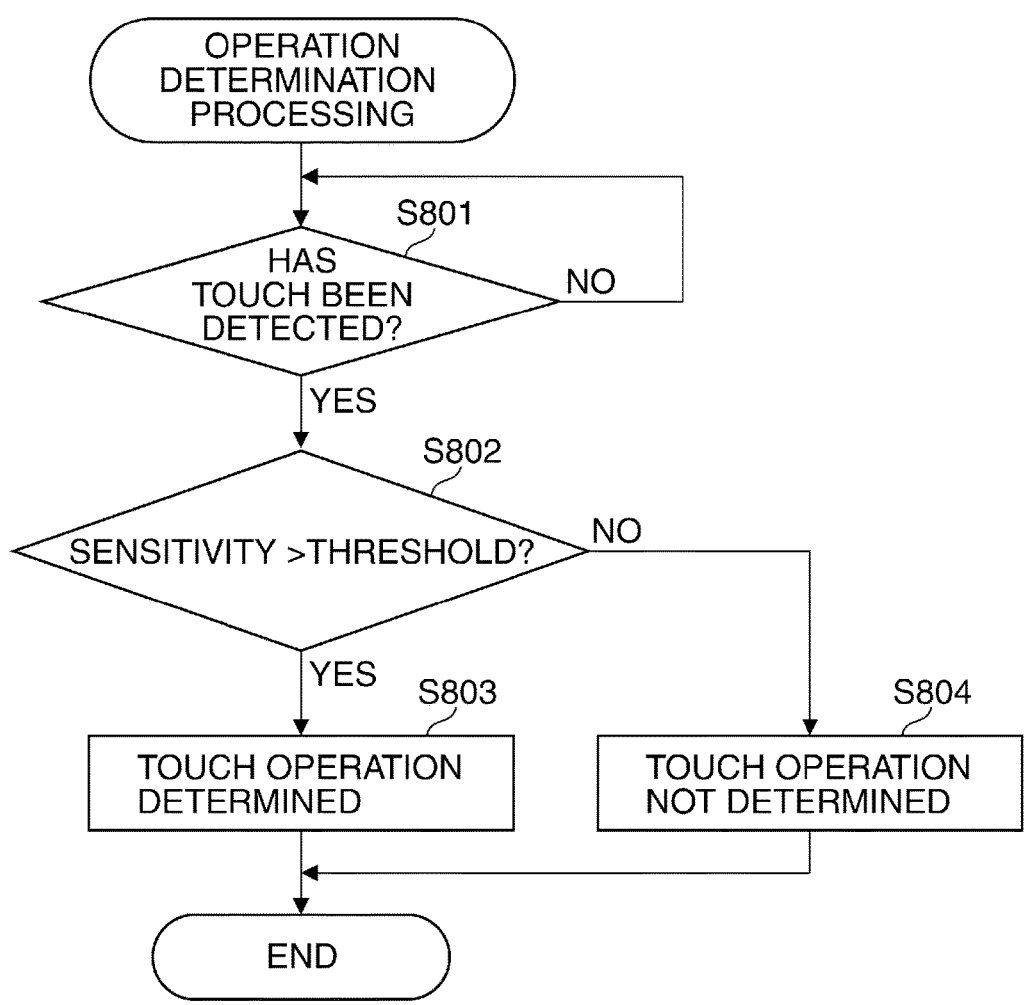
FIG. 8 is a flowchart showing operation determination processing in the second embodiment.

FIG. 8 is a flowchart showing operation determination processing in the present embodiment. The operation determination processing is performed by the CPU 202 reading a program stored in the ROM 204 and applying the program to the RAM 203.

In FIG. 8, the CPU 202 first determines whether a touch operation by a user to the touch panel 403 has been detected (step S801) (second detection unit). Once a touch to the touch panel 403 has been detected in the step S801, the CPU 202 calculates sensitivity of the detected touch, and determines whether the sensitivity is larger than the sensitivity threshold set in the step S603 or S604 in FIG. 6 (step S802). When the calculated sensitivity is determined to be larger than the set sensitivity threshold in the step S802, the CPU 202 determines that the detected touch is a touch operation which the user has intended to do (step S803), and finishes the processing. On the other hand, when the calculated sensitivity is determined to be equal to or less than the set sensitivity threshold in the step S802, the CPU 202 determines that the detected touch is not a touch operation which the user has intend to do. In other words, the CPU 202 determines that the detected touch is an erroneous operation (step S804), and finishes the processing. It should be noted that when the detected touch is determined as a touch operation which the user has intended to do, the processing corresponding to the touch operation is performed, and when the detected touch is determined as not a touch operation which the user has intended to do, the processing corresponding to the touch operation is not performed.

According to the sensitivity threshold setting processing in FIG. 6 and the operation determination processing in FIG. 8, when the approach of the mobile terminal 300 is not detected, the first sensitivity threshold is set as the sensitivity threshold. On the other hand, when the approach of the mobile terminal 300 is detected, the second sensitivity threshold larger than the first sensitivity threshold is set as the sensitivity threshold. In other words, the sensitivity threshold for detecting a touch operation is changed depending on whether the mobile terminal 300 is approaching. Here, the possibility of a touch operation being an erroneous operation changes depending on the distance between the mobile terminal 300 and the image forming apparatus 200. Therefore, a determination related to the possibility of a touch operation being an erroneous operation can appropriately be made depending on the distance between the mobile terminal 300 and the image forming apparatus 200 by changing the sensitivity threshold depending on whether the mobile terminal 300 is approaching. As a result, the determination related to the possibility of an erroneous operation of the image forming apparatus 200 by the user can appropriately be made.

Also, the second sensitivity threshold is set to a value with which the touch operation is less likely to be detected than with the first sensitivity threshold. To be specific, the touch operation is less likely to be detected as the mobile terminal 300 approaches the image forming apparatus 200. Here, as the mobile terminal 300 approaches the image forming apparatus 200, the possibility of the touch operation being an erroneous operation is higher. Therefore, detection of a touch operation which is likely to be an erroneous operation can be suppressed. As a result, the erroneous operation can be effectively suppressed.

It should be noted that when pressure is adopted for the sensitivity threshold, a touch operation is detected when the pressure of the touch operation is higher than the set sensitivity threshold. Therefore, an erroneous operation due to an unintended light touch can surely be suppressed. Also, when time is adopted for the sensitivity threshold, a touch operation is detected when the time of the touch operation is longer than the set threshold. Therefore, an erroneous operation due to an unintended light touch, i.e., a touch operation which is just a slight touch, in most cases, to the touch panel 403 can surely be suppressed.

Moreover, in the present embodiment, when the second sensitivity threshold is set as the sensitivity threshold, a screen notifying a user that the sensitivity threshold has been changed to a value with which the touch operation is less likely to be detected, may be displayed on the display 402. In this case, when the mobile terminal 300 is approaching, the image forming apparatus 200 prompts the user to touch the touch panel 403 stronger or longer. Therefore, when the user is making an intended touch operation, the user can touch the touch panel 403 stronger or longer. As a result, an erroneous operation due to an unintended light touch can effectively be suppressed.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2016-053815, filed Mar. 17, 2016 which is hereby incorporated by reference herein in its entirety.

What is claimed is:

1. An information processing apparatus comprising:
a wireless communication device configured to detect electric waves output from a wireless communication terminal;
a touch panel; and
at least one controller configured to function as:
a display control unit configured to display, on the touch panel, a first screen in which an object is arranged; and
an execution unit configured to, based on a fact that the object is touched:
execute a specific processing in a case where the object is touched in a state where the wireless communication device and the wireless communication terminal are not close to each other, and
display, on the touch panel, a second screen for prompting a user to confirm an instruction in a case where the object is touched in a state where the wireless communication device and the wireless communication terminal are close to each other.

2. An information processing apparatus comprising:
a wireless communication device configured to detect electric waves output from a wireless communication terminal;
a touch panel; and
at least one controller configured to function as:
a display control unit configured to display, on the touch panel, a first screen in which an object is arranged; and
an execution unit configured to, based on a fact that the object is touched:
execute a specific processing in a case where the object is touched in a state where the wireless communication device does not detect electric waves output from the wireless communication terminal, and
display, on the touch panel, a second screen for prompting a user to confirm an instruction in a case where the object is touched in a state where the wireless communication device detects electric waves output from the wireless communication terminal.

3. The information processing apparatus according to claim 2, further comprising a print device configured to form an image on a sheet,
wherein the specific processing is a processing performed by using at least the print device.

4. The information processing apparatus according to claim 2, further comprising a scanner device configured to read an original,
wherein the specific processing is a processing performed by using at least the scanner device.

5. The information processing apparatus according to claim 2, further comprising:
a print device configured to form an image on a sheet; and
a scanner device configured to read an original,
wherein the specific processing is a processing performed by using at least the print device and the scanner device.

6. The information processing apparatus according to claim 2,
wherein the wireless communication device comprises a member having a mark indicating a proximity part to which the wireless communication terminal is to approach, wherein the member having the mark and the touch panel are arranged side by side.

7. The information processing apparatus according to claim 2,
wherein a further object is arranged in the first screen, and the at least one controller executes another specific processing based on a fact that the further object is touched, regardless of whether or not the wireless communication device and the wireless communication terminal are close to each other.

8. The information processing apparatus according to claim 7,
wherein the another specific processing is a processing for displaying a setting screen on the touch panel.

9. The information processing apparatus according to claim 2,
wherein the object arranged in the first screen has an indication indicating a start.

10. The information processing apparatus according to claim 2,
wherein an object for instructing an execution of the specific processing is arranged in the second screen.

11. The information processing apparatus according to claim 1, wherein the execution unit is configured to, based on the fact that the object is touched, execute the specific processing without displaying the second screen on the touch panel in the case where the object is touched in the state where the wireless communication device and the wireless communication terminal are not close to each other.

12. A control method for an information processing apparatus which has a wireless communication device configured to detect electric waves output from a wireless communication terminal, and a touch panel, the control method comprising:
displaying, on the touch panel, a first screen in which an object is arranged; and
executing, based on a fact that the object is touched, a specific processing in a case where the object is touched in a state where the wireless communication device and the wireless communication terminal are not close to each other, and displaying, on the touch panel, a second screen for prompting a user to confirm an instruction in a case where the object is touched in a state where the wireless communication device and the wireless communication terminal are close to each other.

13. The control method according to claim 12,
wherein the wireless communication terminal outputs electric waves in order to perform near field wireless communication.

14. The control method according to claim 12,
wherein the specific processing is a processing performed by using at least a print device to form an image on a sheet.

15. The control method according to claim 12,
wherein the specific processing is a processing performed by using at least a scanner device to read an original.

16. The control method according to claim 12,
wherein the specific processing is a processing performed, by using at least a print device and a scanner device to read an original and form an image on a sheet.

17. The control method according to claim 12,
wherein the wireless communication device comprises a member having a mark indicating a proximity part to which the wireless communication terminal is to approach, wherein the member having the mark and the touch panel are arranged side by side.

18. The control method according to claim 12,
wherein a further object is arranged in the first screen, and the control method further comprises:
executing another specific processing based on a fact that the further object is touched, regardless of whether or not the wireless communication device and the wireless communication terminal are close to each other.

19. The control method according to claim 12,
wherein the object arranged in the first screen has an indication indicating a start.

20. The control method according to claim 12,
wherein an object for instructing an execution of the specific processing is arranged in the second screen.

21. A computer-readable non-transitory storage medium storing a program for causing a computer to execute a control method for an information processing apparatus which has a wireless communication device configured to detect electric waves output from a wireless communication terminal, and a touch panel, the control method comprising:
displaying, on the touch panel, a first screen in which at an object is arranged; and
executing, based on a fact that the object is touched, a specific processing in a case where the object is touched in a state where the wireless communication device and the wireless communication terminal are not close to each other, and displaying, on the touch panel, a second screen for prompting a user to confirm an instruction in a case where the object is touched in a state where the wireless communication device and the wireless communication terminal are close to each other.

22. The information processing apparatus according to claim 2,
wherein the wireless communication terminal outputs electric waves in order to perform near field wireless communication.

* * * * *